United States Patent
Hammond et al.

(10) Patent No.: US 8,978,033 B2
(45) Date of Patent: *Mar. 10, 2015

(54) AUTOMATIC METHOD AND SYSTEM FOR FORMULATING AND TRANSFORMING REPRESENTATIONS OF CONTEXT USED BY INFORMATION SERVICES

(75) Inventors: Kristian Hammond, Chicago, IL (US); Jerome Budzik, Chicago, IL (US); Lawrence Birnbaum, Evanston, IL (US)

(73) Assignee: Northwestern University, Evanston, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/014,391

(22) Filed: Jan. 26, 2011

(65) Prior Publication Data
US 2011/0209150 A1    Aug. 25, 2011

Related U.S. Application Data

(63) Continuation of application No. 10/629,602, filed on Jul. 30, 2003, now Pat. No. 7,895,595.

(51) Int. Cl.
*G06F 9/46* (2006.01)
*G06F 17/30* (2006.01)
*G06Q 30/02* (2012.01)

(52) U.S. Cl.
CPC .... *G06F 17/30867* (2013.01); *G06F 17/30699* (2013.01); *G06Q 30/0255* (2013.01); *G06Q 30/0256* (2013.01)
USPC ......................................... 718/100; 707/713

(58) Field of Classification Search
CPC .................................................. G06F 9/4843
See application file for complete search history.

(56) References Cited

U.S. PATENT DOCUMENTS

| | | | |
|---|---|---|---|
| 5,546,502 A | 8/1996 | Hart et al. | |
| 5,928,325 A * | 7/1999 | Shaughnessy et al. | ....... 709/206 |
| 6,021,405 A | 2/2000 | Celis et al. | |
| 6,205,441 B1 | 3/2001 | Al-omari et al. | |
| 6,236,768 B1 | 5/2001 | Rhodes et al. | |
| 6,523,029 B1 | 2/2003 | Kulyukin | |

(Continued)

OTHER PUBLICATIONS

Lieberman, H., Rosenzweig, E., and Singh, P., "Aria: An Agent for Annotating and Retrieving Images," IEEE.Computer, Jul. 2001.

(Continued)

*Primary Examiner* — Camquy Truong
(74) *Attorney, Agent, or Firm* — Faegre Baker Daniels LLP

(57) ABSTRACT

An information retrieval system for automatically retrieving information related to the context of an active task being manipulated by a user. The system observes the operation of the active task and user interactions, and utilizes predetermined criteria to generate a context representation of the active task that are relevant to the context of the active task. The information retrieval system then processes the context representation to generate queries or search terms for conducting an information search. The information retrieval system reorders the terms in a query so that they occur in a meaningful order as they naturally occur in a document or active task being manipulated by the user. Furthermore, the information retrieval system may access a user profile to retrieve information related to the user, and the select information sources or transform search terms based on attributes related to the user, such as the user's occupation, position in a company, major in school, etc.

41 Claims, 2 Drawing Sheets

(56) References Cited

U.S. PATENT DOCUMENTS

| | | | |
|---|---|---|---|
| 6,581,050 B1 | 6/2003 | Horvitz et al. | |
| 6,647,383 B1 | 11/2003 | August et al. | |
| 7,010,498 B1* | 3/2006 | Berstis | 705/14.38 |
| 7,640,548 B1* | 12/2009 | Yu et al. | 718/106 |
| 7,814,200 B2* | 10/2010 | Lusher et al. | 709/224 |
| 7,895,595 B2* | 2/2011 | Hammond et al. | 718/100 |
| 8,271,473 B2* | 9/2012 | Berg | 707/708 |
| 2001/0000192 A1* | 4/2001 | Gonzalez et al. | 707/3 |
| 2003/0005134 A1 | 1/2003 | Martin et al. | |
| 2003/0050927 A1 | 3/2003 | Hussam | |
| 2004/0267730 A1 | 12/2004 | Dumais et al. | |
| 2006/0074883 A1 | 4/2006 | Teevan et al. | |
| 2008/0154869 A1* | 6/2008 | Leclercq | 707/4 |

OTHER PUBLICATIONS

Czerwinsky, M., Dumais, S., Robertson, G., Dziadosz, S., Tiernan, S., Dantzich, M., "Visualizing implicit queries for information management and retrieval,". In Proceedings of CHI 1999. (Pittsburgh, PA, USA, May 15-20) New York: ACM Press, 1999.
Dumais, S., Cutrell, E., Sarin, R., Horvitz, E., "Implicit Queries IQ) for Contextualized Search", In Proceedings of SIGIR 2004. (Sheffield, UK, Jul. 25-29, 2004). New York: ACM Press, 2004.
Price, M., Golovchinksy, G., and Schilit, B., "Linking by Inking: Trailblazing in a Paper-Like Hypertext" in Proceedings of Hypertext 1998. (Pittsburgh, PA, USA, Jun. 20-24, 1998). New York: ACM Press, 1998.
Bush, V:, "As We May Think" Atlantic Monthly, Jul. 1945.
Hearst, M., "Next Generation Web Search: Setting Our Sites", in IEEE Data Engineering Bulletin, Special issue on Next Generation Web Search, Sep. 2000.
WAIS Inc., How to Search a WAIS Database, Jan. 1999.
Jay Budzik and Kristian J. Hammond, "User Interactions with Everyday Applications as Context for Just-in-time Information Access", Intelligent Information Laboratory, Northwestern University. 8 pgs., 2000.
Henzinger, M., Chang, B., Milch, B., Brin, S. "Query-Free News Search" in Proceedings of the 12th International Conference' on the World Wide Web. Budapest: May 20-24, 2003.
Alexa, Available at .alexa.com/; Feb. 13, 2007.
AltaVista, Available at .altavista.com/; Feb. 13, 2007.
1-click Answers, Available at .answers.corn/main/product—info.jsp; Feb. 13, 2007.
Autonomy ActiveKnowledge Press Release, Available at .autonomy.comn/content/ News/Releases/1997/0407.en.html (Apr. 7, 1999).
Excite, Available at .excite.com/; Feb. 13, 2007.
Google, Available at .google.com/; Feb. 13, 2007.
Lycos, Available at .lycos.com/; Feb. 13, 2007.
Yahoo!, Available at yahoo.com/; Feb. 13, 2007.
Yahoo! Maps, Available at maps.yahoo.com/; Feb. 13, 2007.
Billsus, D., and Pazzani, M., "A Personal News Agent that Talks, Learns and Explains," in Proceedings of the Third International Conference on Autonomous Agents, (Minneapolis MN, USA, May 9-13, 1998) ACM Press, 1998.
Maglio, P., Barrett, R., Campbell, C., Selker, T., "SUITOR: An Attentive Information System," in Proceedings of IUI 2000, (New Orleans, Louisiana, United States, Jan. 9-12, 2000) ACM Press, 2000.
Trevor, J., Hilbert, D., Billsus, D., Vaughan, J., and Tran, Q., "Contextual Contact Retrieval," in Proceedings of IUI 2004, (Funchal, Maderia, Portugal, Jan. 13-16, 2004) ACM Press, 2004.
Bradshaw, S., Scheinkman, A., and Hammond, K. J., "Guiding People to Information: Providing an Interface to a Digital Library Using Reference as a Basis for Indexing," in Proceedings of the 2000 International Conference on Intelligent User Interfaces, (New Orleans, Louisiana, USA, Jan. 9-12, 2000), ACM Press, 2000.
Bradshaw, S., Hammond, K. J., "Automatically Indexing Documents: Content vs. Reference," in Proceedings of Sixth International Conference on Intelligent User Interfaces, (San Francisco, CA, USA Jan. 13-16, 2002), ACM Press, 2002.

Budzik, J., Hammond, K. J., Marlow, C., and Scheinkman, A., "Anticipating Information Needs: Everyday Applications as Interfaces to Internet Information Resources," in Proceedings of the 1998 World Conference of the WWW, Internet and Intranet, (Orlando, FL), AACE Press, 1998.
Budzik, J., Bradshaw, S., Fu, X., and Hammond, K. "Supporting Online Resource Discovery in the Context of Ongoing Tasks with Proactive Software Assistants." International Journal of Human-Computer Studies, 56(1), pp. 47-74. Jan. 2002, Academic Press.
Budzik, J., and Hammond, K. J., "User Interactions with Everyday Applications as Context for Just-in-time Information Access," in Proceedings of the 2000 International Conference on Intelligent User Interfaces, (New Orleans; Louisiana, USA Jan. 9-12, 2000), ACM Press, 2000.
Budzik; J., Hammond, K., and Birnbaum, L., "Information Access in Context," Knowledge Based Systems, 14(1-2), 37-53, Sep. 30, 2001.
Budzik, J., Bradshaw, S., Fu, X., and Hammond, K. J., "Supporting on-line resource discovery in the context of ongoing tasks with proactive software assistants," International Journal of Human-Computer Studies, 56, 47-74, Jan. 2002.
Chen, L., and Sycara, K., "WebMate: A Personal Agent for Browsing and Searching," in Proceedings of the Second International Conference on Autonomous Agents, ACM Press, Sep. 30, 1998.
Chen, L., Cheng, S., Birnbaum, L., and Hammond, K. J., "The interactive chef: a task-sensitive assistant," in Proceedings of the 7th International Conference on Intelligent User Interfaces (San Francisco, CA USA Jan. 13-16, 2002), ACM Press, 2002.
Cheng, I., and Wilensky, R., An Experiment in Enhancing Information Access by Natural Language Processing, Technical Report, Computer Science Division, University of California, Berkeley, Berkeley, CA CSA-97-963, Jul. 1997.
Dean, J., and Henzinger, M. R., "Finding related pages in the World Wide Web," in Proceedings of the Eighth International World Wide Web Conference (Toronto, Canada May 11-14, 1999), Elsevier, 1999.
Hearst, M., Pedersen, J., and Karger, D., "Scatter/Gather as a Tool for the Analysis of Retrieval Results," in Proceedings of the AAAAI Fall Symposium on AI Applications in Knowledge Navigation, (Cambridge, MA Nov. 1995), AAAAI Press, 1995.
Horvitz, E., Breese, J., Heckerman D., Hovel, D., and Rommelse, K., "The Lumiere Project: Bayesian User Modeling for Inferring the Goals and Needs of Software Users," in Proceedings of the Fourteenth Conference on Uncertainty in Artificial Intelligence (Jul. 1998), Aaai Press, 1998.
Howe, A. E., Dreilinger, D., "SavvySearch: A Meta-Search Engine that Learns which Search Engines to Query," AI Magazine, 18(2), 19-25, Jan. 28, 1997.
Johnson, C., Birnbaum, L., Bareiss, R., and Hinrichs, T., "Integrating Organizational Memory and Performance Support," in Proceedings of the 1999 International Conference on Intelligent User Interfaces, (Los Angeles, CA USA Jan. 5-8, 1999) ACM Press, 1999.
Kulyukin, V., "Application-Embedded Retrieval from Distributed Free-Text Collections," in Proceedings of the Sixteenth National Conference on Artificial Intelligence, (Orlando FL, USA Jul. 18-22, 1999) AAAAI Press, 1999.
Leake, D., Scherle, R., Budzik, J., and Hammond, K. J., "Selecting Task-Relevant Sources for Just-in-Time Retrieval," in Proceedings of the AAAAI-99 Workshop on Intelligent Information Systems, (Orlando FL, USA Jul. 18-22, 1999) AAAI Press, 1999.
Lieberman, H., "Letizia: An Agent That Assists Web Browsing," in Proceedings of the International Joint Conference on Artificial Intelligence, (Montreal, Quebec, Canada, Aug. 20-25, 1995).
Lieberman, H., "Integrating User Interface Agents with Conventional Applications," in Proceedings of the 1998 International Conference on Intelligent User Interfaces (IUI 98), (San Francisco CA, USA Jan. 6-9, 1998), ACM Press, 1998.
Pazzani, M., Murarnatsu J., and Billsus,.D., "Syskill & Webert: Identifying interesting Web sites," in Proceedings of the Fourteenth National Conference on Artificial Intelligence, (Portland OR, USA, Nov. 9-11, 1996) AAAI Press, 1996.

(56) References Cited

OTHER PUBLICATIONS

Phelps, T., and Wilensky, R., "Robust Intra-document Locations," in Proceedings of Ninth International World Wide Web Conference, (Amsterdam, the Netherlands May 15-19, 2000), Foretec Seminars, 2000.

Rhodes, B., and Starner, T., "A continuously running automated information retrieval system," in Proceedings of the First International Conference on the Practical Application of Intelligent Agents and Multi Agent Technology, 487-495, May 1, 1996.

Rhodes, 13., "Margin Notes: Building a Contextually Aware Associative Memory," in Proceedings of the 2000 International Conference on Intelligent User Interfaces, (New Orleans, Louisiana, USA Jan. 9-12, 2000), ACM Press, 2000.

Salton, G., Wong, a., and Yang, C. S., "A vector space model for automatic indexing," Communications of the ACM, 18 (11), 613-620, Nov. 1975.

Salton, G., and Buckley, C., "Improving Retrieval Performance by Relevance Feedback," in: Sparck Jones, K., and Willett, P., ed., Readings in Information Retrieval. San Francisco, CA: Morgan Kauffman, Dec. 1997.

Krema, M. et al.; "Themometers and Themostats: Characterizing and Controlling Thematic Attributes of Information."; In Proceedings of Intelligent User Interfaces (San Francisco CA USA, Jan. 13-16, 2002). ACM Press, 2002.

Selberg, E., and Etzioni, 0., "The MetaCrawler Architecture for Resource Aggregation on the Web," IEEE Expert, Nov. 8, 1996.

Turney, P., "Learning to Extract Keyphrases from Text", National Research Council Canada, Institute for Information Technology NRC-41622, Feb. 17, 1999.

Zarnir, O., and Etzioni, O., "Grouper: a Dynamic Clustering Interface to Web Search Results," in Proceedings of the Eighth International Conference on the World-Wide Web, (Toronto Canada, May 11-14, 1999) Elsevier, 1999.

Budzik, J., and Hammond, K. (1999). "Watson: Anticipating and Contextualizing Information Needs." In Proceedings of the Sixty-Second Annual Meeting of the American Society for Information Science (Oct. 31, Nov. 4, 1999). Learned Information, Inc., Medford, Nj, 1999.

Budzik, J. "Information Access in Context." (Ph. D. Diss., Northwestern University, Jun. 2003).

Budzik, J.; Hammond, K., Birnbaum, L., and Krema "Beyond Similarity." In Working notes of the AAAI 2000 Workshop on AI for Web Search (Austin TX USA, Jul. 30-Aug. 1, 2000), Jul. 2000, AAAI Press.

Budzik, J., and Hammond, K. (1999). "Watson: An Infrastructure for Providing Task-Relevant, Just-In-Time Information." Presented at AAAI 1999 Workshop on Intelligent Information Systems (Orlando FL USA, Jul. 18-19, 1999).

Budzik, J., Hammond, K., and Birnbaum, L. "Information Access in Context." Knowledge-Based Systems 14(1-2), pp. 37-53, Mar. 2001. Elsevier.

Knoblock, C., and Minton, S., "The Ariadne Approach to Web-Based Information Integration," IEEE Intelligent Systems, 13(5), Sep./Oct. 1998.

\* cited by examiner

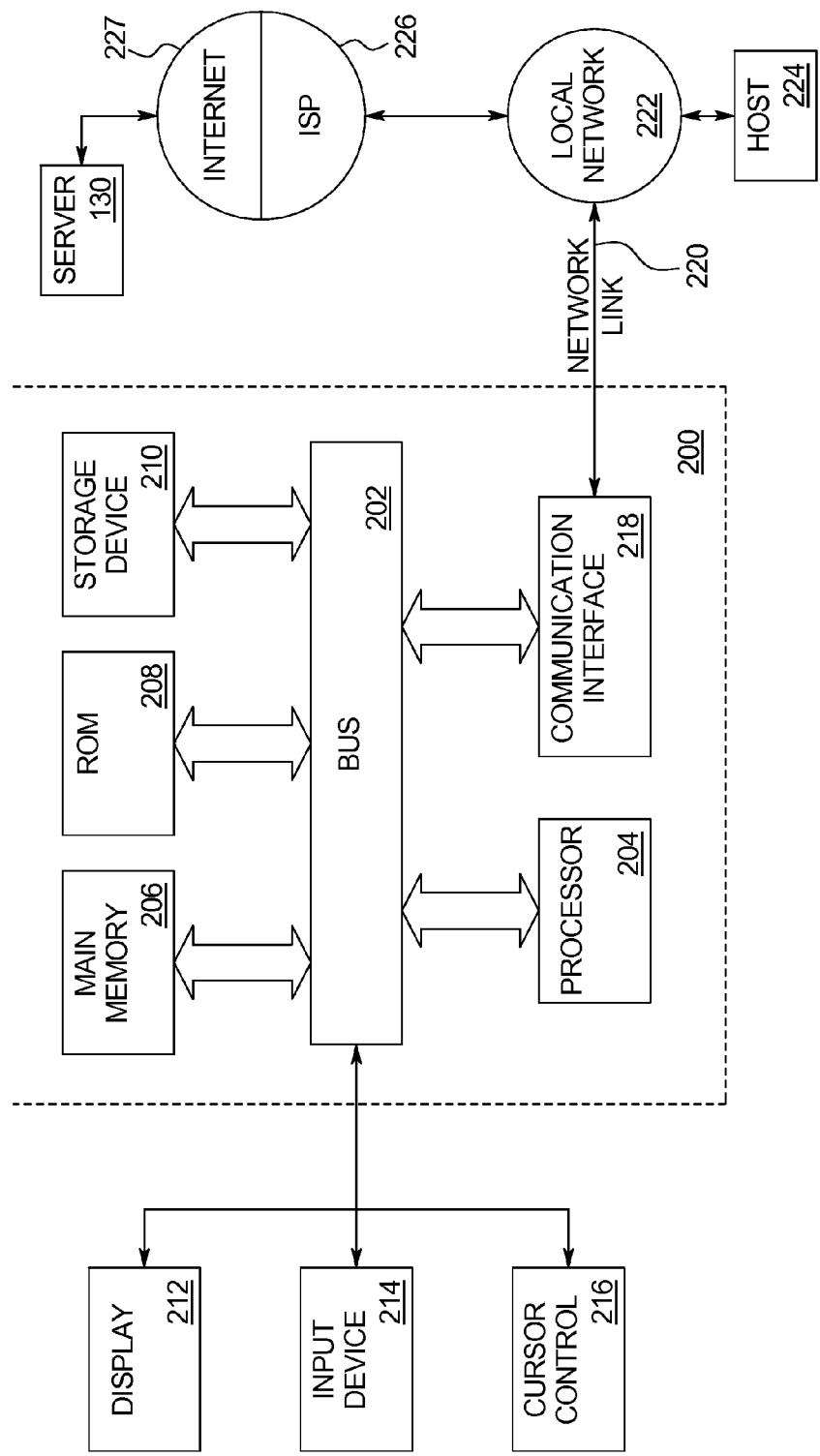

AUTOMATIC METHOD AND SYSTEM FOR FORMULATING AND TRANSFORMING REPRESENTATIONS OF CONTEXT USED BY INFORMATION SERVICES

PRIORITY CLAIM

This application is a continuation application of U.S. application Ser. No. 10/629,602, now U.S. Pat. No. 7,895,595 filed Jul. 30, 2003 the entirety of which is hereby incorporated by reference.

FIELD OF THE DISCLOSURE

The present disclosure generally relates to automatic method and system for forming queries to retrieve information, and more specifically, to method and system to automatically generate keywords, phrases and other entities representing the content and/or context of an active task being manipulated by a user and to retrieve information based on the representation. The representation of work context may be used to support a variety of information services.

BACKGROUND OF THE DISCLOSURE

Information retrieval systems, such as databases or search engines, allow users to retrieve information related to a specific subject by using one or more keywords that may be related to the specific subject. For example, a legal search service called Lexis® provided by the LexisNexis Group is widely used in the legal field to search for cases, journal articles, treaties, as well as other publications that are related to a specific topic or issue. Another information retrieval system, Google®, provided by Google, Inc., is a search engine commonly employed by internet users to search for web sites or online documents that are related to a specific subject matter.

In order to search for and retrieve documents related to a specific subject matter, users need to formulate query that typically comprises a set of keywords, phrases, symbols, commands, and/or other entities that are considered to be relevant to the subject matter or possibly contained in the documents relating to the subject matter. This type of information retrieval system poses problems to users because the users need to be familiar with the proper format for inputting queries into such systems. In addition, users need to have a basic understanding of the subject matter to be searched as well as of properties of the language used to describe that subject in order to formulate proper query to conduct the search.

Some information retrieval systems provide assistance on query formation. For example, a certain website provides a search function called Ask Jeeves that allows users to input their questions in natural language. The system will extract keywords from the questions and conduct a search accordingly. Lexis® also provides a similar function allowing users to input search terms in natural language, either as a question or a statement. The system then extracts keywords from such natural language inputs to search for information related to the keywords.

Although these tools provide basic assistance on query formation during information search and retrieval, such tools cannot function effectively in more realistic work environments in which the content of the query of question plays a paramount role. For example, consider the following search scenarios related to the same keyword "caterpillar."

Scenario 1:
A biology student writing a term paper on animal development. In this case, the information search should be related to metamorphosis, the process by which the caterpillar becomes a butterfly.

Scenario 2:
A contractor working on a construction plan for a new building. The contractor is most likely referring to Caterpillar, Inc., a major manufacturer of construction equipment.

Scenario 3:
A grade-school student writing a book report on Lewis Carroll's book, *Alice's Adventures in Wonderland*. In this case, information retrieved should preferably be related to the character in the book, chapter excerpts, and pictures that the student could include in her paper.

These scenarios illustrate various problems associated with conventional information retrieval systems. The first problem is that conventional information retrieval systems do not consider relevance of active goals in searching for information. The active goals of the user contribute significantly to the interpretation of the search terms and to the criteria for judging a resource as being relevant to the search terms. Typically, these goals are not fully expressed by users in forming their queries when using conventional information retrieval systems.

The second problem is that conventional information retrieval systems are subject to word-sense ambiguity. For example, The word "caterpillar" in scenario 1 should be treated differently from that in scenario 2. The context of the request provides a clear choice of word sense between the insect and the company. Conventional information retrieval systems cannot distinguish the subtle differences unless additional keywords or information are provided by the user.

The third problem is that conventional information retrieval systems fail to consider audience appropriateness when searching and retrieving information based on keywords or queries provided by the user. In addition to the keywords provided by the user, attributes related to the user in each of above the scenarios should also influence the choice of results. Sources appropriate for an advanced biology student will likely not be appropriate for a student in grade school.

Moreover, when using conventional information retrieval systems, users often are unable to provide sufficient information in their queries. Studies show that on average, users' queries tend to be two to three words long. Needless to say, a two-word query most likely does not contain enough information to discern the active goals of the user, or even the appropriate senses of the words in the query.

Furthermore, even if the user has sufficient knowledge to formulate workable queries to conduct a search, the user must be aware of the variety of available resources, decide where to find them, and must know how to use different information retrieval systems correctly, including details such as those concerning special operators like "and," "or," or "+" that are used differently in different information retrieval systems.

Therefore, there is a need to provide an automatic query formation system to assist users in retrieving information related to their active goals without their intervention. There is another need for an information retrieval system to consider the context of words or phrases when conducting an information search and retrieval. There is also a need to improve the performance of an information retrieval system by refining queries based on various attributes related to the users. An additional need exists to automate the information search and retrieval process by forming queries in proper format for conducting information search in different information sources.

SUMMARY OF THE DISCLOSURE

An exemplary information retrieval system addresses the above-noted problems and needs. The exemplary information retrieval system dynamically observes an active task being manipulated by a user, and collects information regarding the active task. The system automatically generates keywords, phrases, and/or representations that are relevant to the context of the task being manipulated by the user based on the observation and the collected information, and a variety of other attributes and/or information, such as attributes concerning the user, the software application being employed, the genre or type of documents/tasks being manipulated, the state of the active task, as well as other considerations or additional information, etc. The system then proactively retrieves information or documents, or references to other relevant resources, e.g., contact information for people who may be assisting or related to the tasks, from various information resources by submitting properly formulated queries based on the search terms. It then analyzes and organizes the search results for presentation to the user.

In one aspect, the exemplary information retrieval system is implemented as a software application executed by a data processing system, such as a computer, PDA (personal digital assistant), mobile phone, or the like, and monitors the operation of other software applications, such as Word, Internet Explorer, Netscape, etc. The data processing system has access to information repositories or information sources, such as databases and/or internet search engines or the like. The information retrieval system monitors activities of active tasks being manipulated by the user and collects information relevant to the activities. The information may be texts in the active task, fonts, styles of texts, locations, and/or other attributes of the active task, as well as user actions in software applications, attributes of the user, the genre or type of the documents/tasks, and so on.

The information retrieval system utilizes predetermined criteria to automatically select keywords, phrases, and other entities or information useful in search that are relevant to the context of the active task being manipulated by the user based on the collected information. The information retrieval system then processes the keywords, phrases, and other entities, etc. to generate queries or search terms for conducting an information search on various information resources. The information retrieval system then analyzes and organizes the search results and makes them accessible to the user.

Various criteria are used to generate context representation and/or representative text items that are relevant to the context of the active task being manipulated by the user. The context representation may include text items, such as symbols, words, numbers, etc. that may be representative to the active task. In one aspect, the information retrieval system excludes words that have at least one of the following attributes: having less than n letters, wherein n is a tunable parameter, typically 2 or 3 (with certain exceptions, such as terms stipulated in a list, and/or being part of a recognized entity, such as a trade name), containing all numbers (with certain exceptions, such as terms stipulated in a list, and/or being part of a recognized entity, such as a street address), and membership in a stop list, which may be in part predetermined, and in part determined by properties of the active task (including, for example, portions of the URL or other identifier of the document or documents relating to the active task, and genre or type of the documents or tasks), properties of the user, and properties of the data sources to be searched.

In one embodiment, the information retrieval system may access information related to exceptions to the exclusion criteria so that certain text items are preserved even if they meet the predetermined criteria. The information retrieval system may access a file containing an exception list that includes text items carrying contextual significance and would be excluded from the application of the exclusion criteria. For example, certain text terms, such as "A1 steak sauce," "i2 Technologies," etc. would be preserved if "A1" and "i2" are part of the exception list. The information retrieval system may exclude recognized constituent items from the application of the exclusion criteria. For instance, if the information retrieval system recognizes a text item containing all numbers as part of an address, the information retrieval system would not exclude that text item.

In another aspect, the information retrieval system determines the relevance of a word, phrase, symbol, other entities, etc. to the context of an active task being manipulated by the user by utilizing an adaptive weighting system. The information retrieval system assigns varying weight to different attributes of a word or text, and calculates an accumulated weight of the word or text by accumulating all weights assigned to the word or text. The attributes may include word size, style, location of the word, etc. A text appearing in a normal style may have its weight incremented by a tunable parameter p1, and a text occurring as emphasized form may have its weight incremented by a tunable parameter p2, wherein p1 and p2 are different weights. The system may assign a heavier weight to a text that appears in a specific portion of the document, in an active window visible to the user, or in a portion selected by the user. The system may increase the weight of a word or text highlighted by the user. The system may also increase the weight of a word or text that is displayed in an emphasized form, such as bold, italic, larger fonts, and the like. The values of the tunable parameters may be depend on properties of the active task, such as genre or type of the active task, attributes of the user manipulating the active task, subject matter of the task, etc.

The system may rank the importance of words or texts based on their respective accumulated weight. The information retrieval system may choose the top ranked texts or words, symbols, properties, etc., such as the top 20, to form queries to conduct an information search and retrieval from various data sources or to serve as a representation of the user's work context for use in a variety of information services. The data sources may locate either locally or remotely coupling to the system via a data transmission network.

The information retrieval system may reorder the terms in a query so that they occur in a meaningful order as they naturally occur in a document or active task being manipulated by the user. For example, if the user is writing a paper regarding to an NBA player, Michael Jordan, the phrase "Michael Jordan" appears frequently in the paper. Thus, a meaningful search term should use a combined term "Michael Jordan" to conduct an information search rather than using "Michael" and "Jordan" separately, or incorrectly ordered.

Thus, when analyzing the document or active task being manipulated by the user, the information retrieval system constructs a table mapping from a word to the term that occurs next to it, and its frequency of occurrence during the initial analysis phase described earlier. The terms in the query are then reordered according to the table. For each term in the query, those terms occurring after it in sequence equal or more times than the mean frequency are considered required next terms, if they also occur in the query based on all other criteria. This process is repeated for each required next term, until one or more sequences of one to k terms are generated. K is a natural number assigned based on system design preference. In one embodiment, these sequences are placed at the beginning of a query.

In another aspect, the information retrieval system may access a user profile to retrieve information related to the user, and to select information sources or transform search terms based on attributes related to the user, such as the user's occupation, position or role in a company, major in school, etc.

Additional aspects and advantages of the present disclosure will become readily apparent to those skilled in this art from the following detailed description, wherein only exemplary embodiments of the present disclosure is shown and described, simply by way of illustration of the best mode contemplated for carrying out the present disclosure. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

BRIEF DESCRIPTION OF THE DRAWINGS

The present disclosure is illustrated by way of example, and not by way of limitation, in the figures of the accompanying drawings and in which like reference numerals refer to similar elements and in which:

FIG. 2 depicts a block diagram of an exemplary data processing system that can be used to implement the information retrieval system according to this disclosure.

DETAILED DESCRIPTION OF THE DISCLOSURE

In the following description, for the purposes of explanation, numerous specific details are set forth in order to provide a thorough understanding of the present disclosure. It will be apparent, however, to one skilled in the art that the present disclosure may be practiced without these specific details. In other instances, well-known structures and devices are shown in block diagram form in order to avoid unnecessarily obscuring the present disclosure.

System Architecture

Figure 1A:
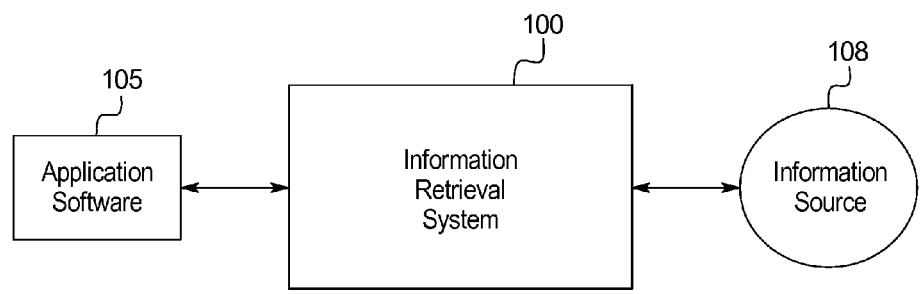
FIG. 1A is a block diagram showing system architecture of an exemplary information retrieval system according this disclosure.

FIG. 1 is a block diagram of system architecture of an exemplary information retrieval system 100 according this disclosure. A user utilizes a data processing system, such as a computer, to execute application software 105. The information retrieval system 100 interacts with the application software 105 to detect and/or observe the operation and activities of an active task that the user is manipulating, and determines the user's potential information needs from this and other information, e.g., attributes of the user, application software, type of active tasks, potential data sources, the state of the active task, the genre or type of the active documents or tasks, as well as other considerations or additional information, etc. Based on the detection and/or observation, the information retrieval system generates a set of queries that are relevant to the content of the active task being manipulated by the user, plus additional information as just mentioned. The information retrieval system 100 then dynamically retrieves information from various information sources based on these queries.

In one embodiment, the information retrieval system 100 is able to access the document that the user is manipulating, and use the actions that the user performs on the document along with other information, such as attributes of the user (e.g., his or role in an organization), and attributes of the task being carried out by the user (e.g., the current step in a sequence of steps of the task), to determine the user's potential information needs. The information retrieval system 100 then generates queries to initiate an information search in information sources 108. The queries generated by the information retrieval system 100 may be formulated into various formats suitable to the respective information source, and their contents as may reflect attributes of the information sources 108. The information retrieved from the information sources 108 may be stored in the same data processing system executing the application software 100, or be kept in one or more repositories that can be accessed by the user.

Since the information retrieval system 100 generates queries based on the activities of the application software 105 without the user intervention, the user does not have to formulate or generate information search queries in a separate search operation.

The information retrieval system 100 may be implemented as a software program configured to be executed by the data processing system. The information retrieval system 100 and the application software 105 may be executed by a data processing system, such as a computer, PDA (personal digital assistant), mobile phone, or the like. The software application 105 may be any type of software applications that a user may employs, such as word processors, web browsers, e-mail applications, etc. on different operating system platforms such as Windows XP®, Palm OS®, Linux®, Mac OS X®, PocketPC® and the like.

The information retrieval system 100 may be part of the application software 105, or an add-in program or software object corresponding to the application software 105 that may be employed by the user. According to one embodiment, whenever the user launches application software 105, the information retrieval system 100 corresponding to the launched application software 105 is also launched. The information retrieval system 100 then monitors the operation of the application software 105 and generates queries based on the observation. According to another embodiment, the information retrieval system 100 is launched manually by the user, such as by pushing a specific button or clicking a specific icon.

The application software 105 may be any application software that is utilized by a user to perform a task or tasks, such as Microsoft Word®, a word processing package, Microsoft Internet Explorer®, and Netscape Navigator®, all Web browsers, Microsoft Outlook®, an email client, and Microsoft Power Point®, a presentation package, and so on.

The information source 108 may be located in the same data processing system that executes the information retrieval system 100, or in different machine or machines that are coupled to the data processing system executing the information retrieval system 100 via a data transmission network, such as intranet, internet, LAN (local area network), or the like, by wire or wirelessly or both.

The information source 108 may include a compilation of searchable data, such as one or more databases, and/or any hardware that performs information search and retrieval, or a combination of both. For example, the information source 108 may be servers that execute software programs for search engines, such as Google, or commercial database services such as LexisNexis or WestLaw. The information source 108 may further connect to other information repositories and/or databases.

Figure 1B:
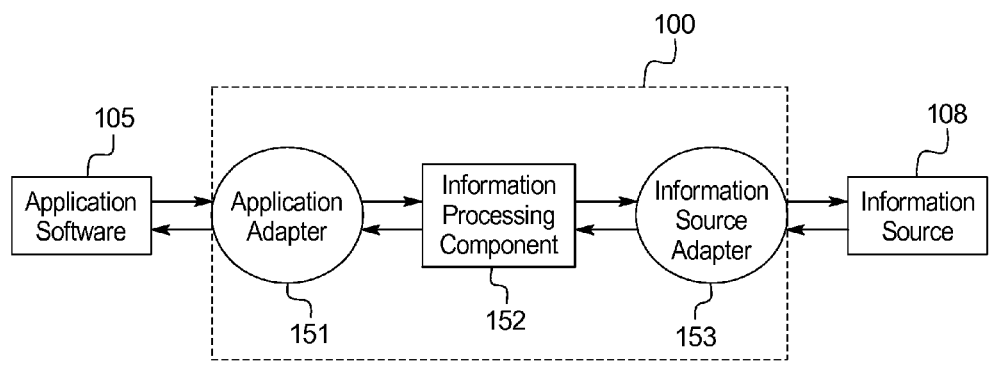
FIG. 1B shows a more detailed architecture of an exemplary information retrieval system.

FIG. 1B shows a more detailed architecture of the information retrieval system 100. The information retrieval system 100 employs an adapter-based architecture, in which both interfaces to application software 105 and to information sources 108 are encapsulated as software components called application adapters 151, and information source adapters 153, respectively. The application adapter 151 and information source adapter 153 are used to interface with various application software 105 and information source 108, respectively, such that the information processing component 152 can communicate with the application software 105 and/or information source 108 properly. The information retrieval system 100 utilizes a component called information processing component 152 to conduct core calculation and data analysis.

Each application adapter 151 and information source adapter 153 is encapsulated. Adapters are akin to software plug-ins, in that both add additional functionality using a predefined interface. The information retrieval system 100 may have several application adapters 151, which are used to gain access to application software's internal representation of a document or active tasks, and the application-level events generated by user interactions with the application software 108.

The application adapters 151 may extract information related to text of the user's current document or active task, including words and/or graphics and/or objects used in the document, attributes of the words, such as size, style and the like, as well as properties of the documents as a whole, such as its genre, type or subject matter. The application adapters 151 may also obtain information related to the operation status of the application software 105, such as the user's focus of attention within a document, the user's action performed on the document, etc. For example, the application adapter 151 may obtain information related to the portion or page of a document that is being displayed to the user, or information related to regions of a document that the user has selected and words contained in the selected regions. The information obtained by the application adapter 151 is then passed to the information processing component 152 for further processing.

The information retrieval system 100 may have different application adapters 151 and information source adapters 153 corresponding to different application software 105 and different information sources 108, respectively. For example, various application adapters 151 can be provided to different application software 105, such as Microsoft Internet Explorer®, and Netscape Navigator®, both Web browsers, Microsoft Outlook®, an email client, and Microsoft Power Point®, a presentation package, that is configured to be executed on different operating system platform, such as Solaris®, Linux®, Windows® operating systems, and the like.

The application adapter 151 and information source adapter 153 corresponding to different application software 151 and information source 108 may be packaged individually such that the information processing component 152 may access each application adapter 151 and/or information source adapter 153 separately. In addition, application adapter 151 and information source adapter 153 corresponding to new application software 151 and information source 108 may be developed and added to the information retrieval system 100 from time to time. Furthermore, the application adapter 151, information source adapter 153 and the information processing component 153 do not have to reside in the same data processing system. Rather, components can reside in different data processing system. The system may retrieve or remotely access and utilize the information processing component 152 as well as application adapters 151 and/or the information source adapter 153 whenever necessary.

This architecture allows the information retrieval system 100 to adapt to changes without requiring a full-scale redeployment. Information source adapters 153 can be updated when information sources 108 are changed. New information source adapters 153 can be written to encapsulate new information service offerings. In addition, as new application software 105 is available, corresponding application adapters 151 can be distributed, enabling the information retrieval system 100 to provide users contextually-relevant information in the new application software 105.

The architecture also provides abstractions for managing communications between the information processing component 152 and application software 105, and between the information processing component 152 and information resources 108. In addition, it specifies a mechanism for managing communications among software components responsible for content analysis and query generation. This architecture also allows the information retrieval system 100 to adapt to different application software 105 and/or information source 108 relatively easily. In each case, the software components may reside locally or remotely.

In one embodiment, information source adapters 153 is written in an XML-based interpreted language. Application adapters 151 may be written in the language most convenient for accessing the internal state of the application software 105. The application adapters 151 can communicate with the information processing component 152 via a standard programming interface, such as an application programming interface (API) or using the application software's internal scripting language. For those application software that does not readily support access to internal state through one of those mechanisms, application adapters 151 can be written, for example, by trapping low-level operating system library calls that draw text to the screen.

The application adapter 151 may obtain information related to the document that the user is manipulating using the application software's programming API (Application Programming Interface) or OS-level APIs. For example, for Microsoft Word®, the "Normal style" of the current document is determined by inspecting the object model's style objects. For each paragraph in the document, the style is extracted by inspecting the properties exposed by the object model for the range. If the weight of the font used in the range is bold, if the range is centered, or if the range of text is displayed in a font size that is greater than the font associated with the Normal style in the current document, the range is classified as emphasized. If the font size of the text in the current range is less than the size of the font associated with the Normal style, then range is classified as de-emphasized. Otherwise, the range is classified as normal. Selected regions are determined by inspecting the object model's selection object, and are sent separately using the selected style.

If the application software does not easily allow access to such attributes through an API, the application adapters 151 may compute these properties. The process may involve, for example, computing average or modal values for the properties over certain spans of text, and comparing text within the spans to these averages or modes to determine whether the text is emphasized. For example, if the font is larger than the average or modal size computed by the application adapters 151, the text is considered and/or classified as emphasized.

The application adapters 151 interpret application-level events so that they can be translated into an event representation the information processing component 152 can process. For example, when a user types text into a document in Microsoft Word®, keyboard events are generated in the application. The Word application adapter interprets these events, paying mind to their target (in this case, the document the user is modifying). The application adapter 151 can then relay a message to the information processing component 152, in this case, indicating the document has changed. The information processing component 152 then queries the application adapter 151, requesting a representation of the updated document. The application adapter 151 then produces a document representation and sends it to the information processing component 152 for analysis.

In response, the information processing component 152 analyzes the content of the document that the user is manipulating or the actions she performs. Based on the analysis as well as other information, such as attributes of the user and of the task being carried out, and/or other attributes of the application software, the information processing component 152 determines to query one or more information sources 108. The information processing component 152 may produce an internal query representation capable of representing Boolean combinations of terms or quoted phrases. This internal query representation is sent to information source adapters 153 corresponding to the information sources 108 that the information processing component 152 decides to query. Each information source adapter 153 translates the internal query representation into the source-specific query language and/or modifies the content based on attributes of the source, and executes a search. Information source adapters 153 are also responsible for parsing the results of a search into a standard representation, as in metasearch applications.

In order to support flexible parameterization and customization of information extraction and keyword selection algorithms used to characterize the context of a users active task, the information processing component 152 comprises two types of constituent processing components, context analyzers and query producers, both of which are encapsulated and organized using a shared memory in a Blackboard-style system. Both types of constituent information processing components may be executed on the user's machine and/or hosted remotely on a network server responsible for their executions.

The information processing component 152 enables the coordination of constituent processing components through a hierarchical shared memory, or blackboard. Each component has its own thread of control, and can listen to any level of the hierarchical shared memory in order to react when information is added or removed. The architecture supports run-time configurable information processing plug-ins so that the system's functionality can easily adapt to user requirements after deployment.

The first type of constituent information processing components is context analyzers, which produce representations of the users context. Context analyzers performs its function by analyzing the users actions within applications, and by analyzing the content of the document the user is manipulating. For example, the context analyzer produces a frequency histogram of the document the user is currently manipulating.

The second type of constituent information processing components is query producers. Query producers are activated when representations of the user's context become available via the shared memory. Query producers are responsible for transforming representations of the user's context into a set of information goals or queries. The query producers may use a histogram of word frequencies in the user's document, presentation information provided by the application adapters and statistical information about a given language to arrive at a ranked list of the most representative words in a given document.

FIG. 2 shows a block diagram of an exemplary data processing system that can be used to implement the information retrieval system 100. The data processing system 200 includes a bus 202 or other communication mechanism for communicating information, and a data processor 204 coupled with bus 202 for processing data. Data processing system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by data processor 204. Data processing system 200 further includes a read only memory (ROM) 208 or other static storage device coupled to bus 202 for storing static information and instructions for processor 204. A storage device 210, such as a magnetic disk or optical disk, is provided and coupled to bus 802 for storing information and instructions.

The data processing system 200 may be coupled via bus 202 to a display 212, such as a cathode ray tube (CRT) or liquid crystal display (LCD), for displaying information to an operator. An input device 214, including alphanumeric and other keys, is coupled to bus 202 for communicating information and command selections to processor 204. Another type of user input device is cursor control 216, such as a mouse, a trackball, or cursor direction keys and the like for communicating direction information and command selections to processor 804 and for controlling cursor movement on display 212.

The data processing system 200 is controlled in response to processor 204 executing one or more sequences of one or more instructions contained in main memory 206. Such instructions may be read into main memory 206 from another machine-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the disclosure. Thus, embodiments of the disclosure are not limited to any specific combination of hardware circuitry and software.

The term "machine readable medium" as used herein refers to any medium that participates in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio wave and infrared data communications.

Common forms of machine readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a data processing system can read.

Various forms of machine-readable media may be involved in carrying one or more sequences of one or more instructions to processor 204 for execution. For example, the instructions may initially be carried on a magnetic disk of a remote data processing system, such as a server. The remote data processing system can load the instructions into its dynamic memory and send the instructions over a telephone line using a modem. A modem local to data processing system 200 can receive the data on the telephone line and use an infrared transmitter to convert the data to an infrared signal. An infrared detector can receive the data carried in the infrared signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Data processing system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host data processing system 224 or to data equipment operated by an Internet Service Provider (ISP) 226. ISP 226 in turn provides data communication services through the world large packet data communication network now commonly referred to as the Internet 227. Local network 222 and Internet 227 both use electrical, electromagnetic or optical signals that carry digital data streams. The signals through the various networks and the signals on network link 220 and through communication interface 218, which carry the digital data to and from data processing system 200, are exemplary forms of carrier waves transporting the information.

Data processing system 200 can send messages and receive data, including program code, through the network(s), network link 220 and communication interface 218. In the Internet example, a server 230 might transmit a requested code for an application program through Internet 227, ISP 226, local network 222 and communication interface 218.

The data processing system 200 also has various signal input/output ports (not shown in the drawing) for connecting to and communicating with peripheral devices, such as USB port, PS/2 port, serial port, parallel port, IEEE-1394 port, infra red communication port, etc., or other proprietary ports. The data processing system 200 may communicate with the data processing system via such signal input/output ports.

According to one embodiment, in order to support the awareness of the context of the tasks users are performing, and without requiring additional overhead from the user, the information retrieval system 100 is coupled closely with the application software 105. This coupling allows the information retrieval system 100 to become aware of what the user is doing, and then react to the user by proactively providing her with access to useful resources by constructing and manipulating lexical representations of the user's current work product. These representations are used to access networked resources on behalf of the user, typically by querying information retrieval systems, that may supply documents and/or references to other relevant information items. The obtained results may be further processed and organized by the information retrieval system for presentation to the user.

Text Analysis

Referring to FIG. 1 B, the information processing component 152 receives information related to operations and/or activities of the application software 105 from the application adapter 151. Based on the received information, the information processing component 152 determines the content of the active task or tasks. Based on this determination, the information processing component 152 generates appropriate queries related to the content to conduct searches in different information sources 108. For example, the information processing component 152 may generate queries for retrieving documents related to subject matters that are similar to, or have opposite viewpoints of, those of the document that the user is manipulating. The queries are sent to a variety of information sources 108, each of which is accessible to the information retrieval system 100 via a corresponding information source adapter 153. When search results are returned from the information sources 108, the information retrieval system 100 may further analyze the results and present them to the user.

Exemplary processes for analyzing active tasks and generating queries related to the content of active tasks are illustrated using the following examples, in which a user employs Microsoft Word® to review and/or prepare a document related to a specific subject matter. When the user launches Microsoft Word® on her computer, the information retrieval system 100 is also launched, either automatically or manually. An application adapter 108 corresponding to Microsoft Word is used to interface with Microsoft Word®.

In order to retrieve related documents as the user is writing or browsing, the information processing component 152 constructs a query or a set of queries based on the content of the document at hand, and other information as described earlier. The queries produced by the information processing component 152 are sent to external information sources 108 to retrieve related documents.

The text of an active document being manipulated by the user and analyzed by the information retrieval system 100 includes a plurality of text items comprising symbols, words, numbers, etc. The text may include spans of text representing a detectable section of a document, such as a document's title, or other relevant portions of the document as determined by the application programming interface (API) accessed by the application adapter 151 or by other means, including the operating system. Software APIs for accessing or automating existing software typically divide texts into logical portions representing constituent parts. For example, a presentation application software such as Microsoft PowerPoint® provides methods for determining the boundaries of texts contained on a single slide, and further divides the texts on a slide into regions such as the title and bullet points. In addition to this method of determining the natural boundaries of portions of texts, special purpose constituent element detectors may be constructed that recognize sequence of tokens, symbols, etc., that comprise a constituent element, such as a street address.

The text of an active document being manipulated by the user may include constituent elements that generally would be excluded from the context representation or query constructed by the information processing component 152. However, under certain circumstances, the constituent elements may be useful in formulating queries to specific information sources 108 that require specific query content. For example, a constituent element such as an address may be required by a mapping engine.

In one embodiment, the information retrieval system applies different rules to eliminate constituent elements based on properties of the active task. The information retrieval system may apply different query transformation rules based on properties of the active task.

The information retrieval system utilizes software components to detect constituent elements. The software components represent a finite state automaton that accepts sequences of characters, character types, symbols, symbol types, strings or sequences of symbols, texts, and the like. When a constituent element, such as address, signature block, navigation bar, etc., is detected by the finite state automaton corresponding to a given constituent element type, the information processing component 152 may be caused to perform a specific set of actions based on a set of transformation rules corresponding to the detected type of constituent elements, such as eliminating certain constituent elements, adding additional information related to the detected constituent elements into the query, and/or selecting a particular information source 108 based on the detected constituent elements to conduct information search, etc. Details of transformation rules that may be used will be discussed shortly.

For example, a constituent element detector for a signature block in an email might be composed of a finite state automaton accepting sequences of characters that include the sender's name, followed by sequences of characters matching a pattern representative of phone numbers and/or a street address. In response to the detection of the specific constituent element, the information processing component 152 may utilize a transformation rule that excludes the signature block from the text being analyzed to form a context characterization or representation, and/or information request.

The information processing component 152 employs a term selection algorithm that implements a set of heuristics to eliminate words that are unlikely to be related to the subject matter of the document that the user is manipulating, and to select words that may be indicative of the subject of the document. The words included in a document typically have the property of disambiguating each other's meaning. For example, out-of-context, it is equally likely that the phrase, "oracle delphi," could be referring to a partnership between two software companies, or it could be evoking the place of worship in ancient Greece. However, when the phrase is coupled with other words used in the same context in which the above words were drawn, the reader can easily disambiguate among potential meanings For example, additional context words like: "software product development information technology," may indicate that the phrase "oracle delphi" may be referring to a partnership between two software companies, while words like: "ancient greece apollo omphalos pythia," may suggest that the phrase "oracle delphi" is referring to the place of worship in ancient Greece. Thus, these additional words would assist in generating more precise queries because they eliminate the ambiguity inherent in shorter queries.

The information processing component 152 may be implemented based on analysis on how documents are structured to convey pragmatic concerns, in particular, the importance of spans of text In addition, the information processing component 152 may leverage as much contextual information as possible from the application software 105, including indications of the user's current focus of attention, and other information, such as attributes related to the user, the application software being utilized, the state of the active task, as well as other considerations or additional information, etc.

During operation, documents being manipulated by the user are represented to the information processing component 152 as a stream of words or punctuation. An exemplary information processing component 152 may use one or more of the following word selection heuristics to convert the words and/or punctuation:

Heuristic 1: Remove Stop Words:

The information retrieval system 100 maintains, or has access to, a stop list including the most commonly occurring words that provide little information about the subject of the user's document. Words included in the stop list are not good search terms because the information resources 108 will often remove them automatically. The stop list may be created by a linguistic expert, by an automatic analysis (such as statistical), or by the user or by a combination of all three. In one embodiment, the stop list may be stored in the storage device of the data processing system on which the user is working The stop list may also be retrieved or accessed dynamically during its operation from a remote computer or server when the information retrieval system 100 is launched. In operation, when the information processing component 152 processes texts retrieved from the document that the user is manipulating, the information processing component 152 will access the stop list and parse through the texts of the document to remove words listed in the stop list, unless they are part of a larger recognized entity. The stop list may be of general use, specific to data sources or domains of application, or both. Exception lists associated with particular elimination criteria or other analysis rules may be similarly constructed, distributed and accessed.

Heuristic 2: Value Frequently Used Words:

The information processing component 152 may calculate weights for each word contained in the document based on their respective attributes. For instance, words used frequently are representative of the document's content. Thus, the information processing component 152 dynamically calculates the frequency, or the number of appearance, of each text in the document that the user is manipulating. The information component 152 may select a certain number of texts to construct queries based on their frequency rankings.

Heuristic 3: Value Emphasized Words:

The application adapter 151 may determine styling attributes for each word contained in the document and communicate the result to the information processing component 152. Styles of words may be an indication of importance of words used in a document. Emphasized words are more representative of the document's content than other words. Emphasized words are used in titles, section headings, etc. Information related to styles of words is obtained by the application adapter 151 and forwarded to the information processing component 152. Based on the information, the information processing component 152 determines whether a word or words are emphasized.

Heuristic 4: Value Words that Appear Near the User's Focus of Attention:

The information processing component 152 may determine location attributes for each word contained in the document that the user is manipulating based on the location of each word in the document, as communicated by the application adapter 151. For example, texts contained in a current slide being displayed to the user will be more indicative of her immediate needs than the text in the rest of the presentation. If a user selects a region of text in the document, texts contained in the selected region may be given a larger weight than words in other sections.

Heuristic 5: Devalue Words that Appear to be Intentionally De-Emphasized:

Another styling attribute that the information processing component 152 may receive from the application adapter 151 is whether a word is de-emphasized. De-emphasized words are deliberately made smaller by the author to make them less distracting or, in some cases (e.g., privacy statements), hard to read. Thus, de-emphasized words, such as words in small fonts, may be exempt from Heuristic 4.

Heuristic 6: Eliminate Words that Occur in Sections of the Document that are not Indicative of its Content.

Words that occur in the navigation bar of a Web page are only marginally useful, and tend to interfere with other useful text analysis heuristics we use. Likewise words that occur in a document template (e.g., in a footer that occurs on every page) are not as useful as those that occur in the main body of the document.

The heuristics described above are for illustration purpose only and are not exhaustive. Other heuristics can also be used depending on design preference.

As discussed earlier, documents are represented to the information processing component 152 as a stream of words or punctuation. In operation, words contained in a document usually fall in one of four styles: normal, emphasized, de-emphasized, selected or list item. As described earlier, the information processing component 152 uses a stop list to tag common words that have little information value (e.g., words like "and," "or," and "the"). Punctuation may be kept in order to make the detection of phrase boundaries easier.

Text that appears in a heavier type or in a larger font size draws the reader's attention more than other words, and thus should be entitled to heavier weight in considering relevance to the content of the document. The application adapter 151 compares spans of text in the active task with respect to the normal text size and weight for the user's current document, which can vary from document to document. Thus, in order to determine whether a span of text is emphasized, de-emphasized, or normal, the application adapter 151 needs to calculate values for the normal presentation style, such as average height of words contained in the document being manipulated by the user.

Information related to attributes of words in a document is obtained by the application adapter 151 corresponding to each application software. For example, attributes of a span of text, such as emphasized, de-emphasized, or normal, may be obtained by detecting the appropriate structures in HTML documents (for Internet Explorer), or by using the word style properties provided by the Microsoft Office® applications. Each application software has a different set of heuristics tailored to the typical structure and content of documents created or viewed within that application software. In order to compute the normal presentation style, the frequency of the line heights and font weights for each span of text in a document is measured. It is assumed that the line height of a span of text can be determined through the programming interface provided by the application.

Some application software provides information related to normal style of the active task. The application adapter 151 may access such information via the application programming interface (API) of the application software. Should the API not provide direct access to a "normal" presentation style, the application adapter 151 may compute the frequency distribution of any given presentation property, such as font size or line height. The mode of this frequency distribution (the most frequent value of the presentation property) represents the normal value of this property.

If, however, application software does not provide information related to attributes of text, the application adapter 151 needs to compute the normal presentation style of the text based on the observation of the text. The application adapter 151 may trap low-level operating system calls sued to draw text to the screen to determine the required presentation attributes. The normal value of each attribute can be computed in a way similar to computing those provided by the application software.

The application adapter 151 maintains two tables: one maps from line height to frequency, and the other maps from font weight to frequency. For each span of text in the document, the line height and font weights are computed, and their frequencies are incremented. The most frequent line height and font weight is considered the "normal" size and weight. Those spans of text that have line heights above the normal size are classified as emphasized. Those that have line heights below the normal size are classified as de-emphasized.

The application adapter 151 eliminates background texts contained in the document being manipulated by the user. Documents with multiple pages often contain text that occurs on every page as part of standard headers or footers. Analysis of the frequency of words in the document would result in the high frequencies being assigned to words that occur in background text, even though these highly frequent words may have little to do with the primary content of the document.

In order to eliminate background or template text, the application adapter 151 eliminates spans of identical text that occur on most pages in the same locations. Spans of text that occur at the same locations are detected by enumerating the list of text spans in a document. It is assumed that bounding rectangles can be determined by examining the document object model within the application software. A table that maps from a string representing the bounding rectangle to a list of strings contained within that rectangle on each page is maintained. A second table that maps from a string representing the bounding rectangle and the string contained within the rectangle to its frequency in that position is also kept. For each span of text, the span is added to the first table if it does not already contain it, and its count is incremented in the second table. Then for each span of text, a span is eliminated if it occurs in the same place more than T times, where T is a tunable parameter related to the number of pages in the document. For example, T=0.8 n, where n is the number of pages in the document.

The information computed by the application adapter 151 is communicated to the information processing component 152. The information processing component 152 then transforms the string of characters it receives into sequences of characters that represent words. The information processing component 152 splits the character string along spaces and carriage returns, and then removes punctuation except for the dash.

The information processing component 152 further utilizes several elimination criteria to convert the text to generate a list of the key words and/or phrases and/or other entities representing the user's context. The information processing component 152 eliminates words according to the elimination criteria described above.

The information processing component 152 may use an additional elimination criterion for Web pages to remove words that occur in the host name of a Web site. For example, if the document being manipulated by the user contains a URL www.cnn.com, the information processing component 152 will ignore the term "cnn."

For words surviving the elimination process, the information processing component 152 applies an adaptive weight system to determine the importance of the words based on the attributes of the words. The attributes of the words are obtained by the application adapters 151 as described earlier. The weight for each word is initially set to zero. For each occurrence of a word in a document, the weight is computed by adding an incremental value to the initial weight. When a word occurs in a normal style its weight is incremented by a tunable parameter $p_1$. When it occurs as emphasized its weight is incremented by a tunable parameter $p_2$. When it occurs as de-emphasized its weight is incremented by a tunable parameter $p_3$. Typically $p_2 > p_1 > p_3$ with $p_1=1$, $p_2=2$, and $p_3=1/k$, where k is the number of terms to be included in the document characterization being constructed. Words that appear in regions selected by the user in the document are incremented by n times the maximum global word frequency, or some other parameters derived from the active task or its attributes, wherein N is typically equal to 2, in order to ensure that they will appear in the characterization or the representation being constructed. Words with weight above the mean are selected as one of the words that will be considered for inclusion in the query.

The attributes described in the adaptive weight system are for illustrative purpose only, and do not intend to be exhaustive. Other attributes and weights can also be utilized to assign weights to different words.

Query Formation and Transformation

After the information processing component 152 extracts words relevant to the content of the document being manipulated by the user, the information processing component 152 performs a query formation process to generate queries to retrieve documents being manipulated by the user. The information processing component 152 uses the top n words from the ordering resulting from the weighting described above to form the queries. Typically n=20. Other number of n can be used depending on design preference, for example, properties of the information source being queried.

The information processing component 152 reorders the terms in the query so that they occur in a meaningful order as they naturally occur in the document. For example, if the user is writing a paper regarding to the NBA player, Michael Jordan, the phrase "Michael Jordan" appears frequently in the paper. Thus, a meaningful search query should use the combined terms "Michael Jordan" to conduct an information search rather than using "Michael" and "Jordan" separately, or in the wrong order, or separated by other terms, all of which would reduce its utility in a query for many searchable data sources.

In order to determine which word goes with which, the information processing component 152 constructs a table mapping from word to the term that occurs next to it, and its frequency of occurrence during the initial analysis phase described earlier. The terms in the query are then reordered according to the table. For each term in the query, those terms occurring after it in sequence equal or more times than the mean frequency are considered required next terms, if they also occur in the query. This process is repeated for each required next term, until one or more sequences of one to k terms are generated. K is a natural number assigned based on system design preference. In one embodiment, these sequences are placed at the beginning of a query. This query is then used to retrieve information from the information sources 108. For instance, in the paper, the term "Jordan" appears after the term "Michael" frequently. The information processing component 152 thus will consider "Jordan" a required term after "Michael." Thus, even if "Michael" and "Jordan" have different weights after the initial text processing procedure, the information processing component 152 is able to generate a combined search term "Michael Jordan."

In addition to the queries generated by the information retrieval system 100, the user may manually submit a query to initiate an information search process. According to one embodiment, the information processing component 152 directly submits the query to various information sources 108. According to another embodiment, in response to a query submitted by the user, the information processing component 152 incorporates the user-generated query or queries into the query generated by the information processing component 152 by concatenating the query terms in the user's query and the previously constructed contextual query to form a single query. In this way, the information processing component 152 brings the previously gathered information about the context of the user's work to bear directly on the process of servicing a user's explicit query.

For example, when a user is viewing a page about NASA's latest Mars probe, and enters the query "life", the information processing component 152 dynamically formulates queries related to the probe with the term "life." Thus, the information processing system 152 is able to retrieve a list of pages about life on Mars, not the magazine, the game, the algorithm, nor the biological definition, that would usually comes up using a single term "life". Because the information processing component 152 grounds explicit queries in the context of the current document, the results returned are coherent, even for this highly ambiguous query.

The information retrieval system 100 may utilize additional techniques to refine or transform queries generated based on the content of the document being manipulated by the user. In one embodiment, query transformations comprise two processes: (1) transformation activation and (2) application of transformation rules. Query transformations may be activated either automatically in response to certain conditions being met, or manually by user control. The transformation rules utilized for conducting query transformation may be dependent on the type of condition that activates the transformation. The transformation rules may affect the contents of queries by adding, deleting, substituting, and/or transposing texts in the information query. Additionally, the transformation rules may also affect the information sources 108 to be queried when certain activation criteria are met.

The information retrieval system 100 may alter the query based on preset conditions or profiles. For example, the information processing component 152 may generate a refined query by adding information related to attributes of the user, such as the user's occupation, position in a company, major in school, instruction, etc. For example, if the user is a teacher, one or more terms related to teaching, education, school, etc. may be added to the query, such as "curriculum," "syllabi," "class schedule," etc. According to another example, as a search condition, the user may designate a certain number of keywords that must be used in searching information. Thus, when the information processing component 152 formulates search terms, the user set conditions are accessed and additional terms are added to the query according to the conditions. In addition, the information resources used to retrieve information may selected based on the user profile or the preset condition. For example, if the user is a teacher, databases related to education are searched. If the user prefers certain databases or search engines, the user may set these conditions to refine the search result. Additionally, the system may automatically select appropriate data sources based on properties of the active task, attributes related to the user, the application software being utilized, the state of the active task, as well as other considerations or additional information, etc.

Queries may be further modified using pre-defined query transformation rules to modify the query or queries. The information processing component 152 may apply the query transformation rules to substitute or alter words contained in the query. For example, the information processing component 152 can access a substitution table including an antecedent and a consequent. The antecedent contains the word that will be substituted, while the consequent contains words that the antecedent will be substituted with. Each query transformation rule is applied by matching the antecedent against each word in the query and, when a match occurs, substituting the word matching the antecedent with its consequent.

For example, counter arguments related to the same subject matter may be important to the user. Thus, knowledge of opposing experts in particular domains is important to the user's active tasks. For instance, when the user cites Karl Marx's idea of an ideal economic state, the information retrieval system 100 will retrieve two sets of articles: one set representing Marx's point of view, and another set representing Adam Smith's opinion. In order to retrieve documents or information related to the counter arguments, the information processing component 152 may apply a set of query transformation rules as follows:

RULE(ruleset1): SUBST karl marx/adam smith
RULE(ruleset1): SUBST adam smith/karl marx
RULE(ruleset1): SUBST marx/smith
RULE(ruleset1): SUBST smith/marx
RULE(ruleset2): SUBST capitalism/communism
RULE(ruleset2): SUBST communism/capitalism Each of the query transformation rules may be triggered by the same or different activation criteria. Query transformation rules are grouped into sets of rules. The rules are activated and applied when the rule set's activation criteria are met. Information extraction routines are similarly grouped and associated with activation criteria. Information extraction routines detect special-purpose, structured information within the document the user is manipulating. Exemplary activation criteria may include:

Properties of the text or content being manipulated by the user as communicated to the information processing component 152 by the application adapter 151 including, for instance, the genre of the text, such as contract, research report, proposal, etc., or the subject matter of the text, such as biology, engineering, literature, etc, both as determined by the occurrence of specific lexicalizations representing a certain concept, words, or other symbols. For example, if the content describes a specific event, then information extraction routines that recognize the principal actors in the event, the event's location, the duration, the occasion, etc., will be activated. Search terms related to these additional traits will be added to the query. According to another example, the user may input such indication manually.

The genre or type of the active task that the user is manipulating may be determined based on the type of application software being employed to perform the active task. For example, an email application displays and allows the user to compose email. In addition, the application software may provide additional information related to the active task based on the working environment used in performing the active task. For instance, some application software provides document templates, such as resume, customer inquiries, training manuals, etc. Thus, the information retrieval system may obtain or determine the genre or type of the active task based on the type of templates being used by the user.

The content of the text that the user is manipulating may contain words, phrases, symbols or other properties that may be used to determine the type of document. For example, a scientific research paper generally includes sections such as "Abstract" and "References." The detection of such terms in a document may serve as an indicator that the document is a research paper.

In addition, other properties of the text that the user is manipulating may be computed by inspecting its contents. For example, the reading level of the text can be computed as a function of sentence length, average word length, etc. In addition, other properties such as the level of detail of the text can be computed by examining the specificity of the language used in its contents.

(2) Properties of the user and the user's position or role within an organization. For example, if the user is a salesman in an engineering company, technical jargon in the query could be translated into more straightforward language, allowing the system to retrieve documents more comprehensible to the user. The information related to the user may be stored in a file that is accessible by the information retrieval system. The identity of the user may be determined during a log-in process.

(3) Properties of the data source to be interrogated by the information source adapters 153 on behalf of the information processing component 152. These properties may include, for example, a list of texts or types of texts that comprise valid queries to the data source, or additionally a list of texts or types of texts that should be excluded from inclusion in queries sent to the data source. For example, if the data source is external to an organization, internal product names can be translated into their market equivalents using the kind of transformation rule described above.

(4) Properties of the application software being manipulated by the user as detected by the application adapter 151 and communicated to the information processing component 152. For example, if the user is editing a document that uses the "Resume" template, the system can activate custom content analysis routines. In another example, if the application software used is an e-mail application software, a predetermined set of transformation rules corresponding to e-mail application software may be activated. For instance, a transformation rule may be applied to eliminate specific portions of text such as the signature or salutation.

(5) The current state of the active task in which the user is currently engaged as determined either automatically by the application adapter 151 or by other means, such as a user input indicating her current step in a multi-step task. For example, the information retrieval system may determine the active task being related to an on-line shopping process based on price tags, shopping cart icons, etc. In response, the information retrieval system may provide several clickable icons including "product survey," "dealers," "coupons," etc. to solicit inputs from the user related to the stage of the online shopping process, so that the information retrieval system may transform search queries based on the different stages of the shopping process and retrieve information related thereto.

Users may also be presented with means for selecting and/or designating query transformations along one or more specific traits. For example, a GUI (Graphic User Interface)

with clickable buttons, menus, etc. may be presented to the user. The clickable buttons or menus comprise selections of transformation traits, such as "economy," "law," "where to buy," "people," etc. The user may activate one or more selections by clicking the corresponding buttons. In response, the information retrieval system will add phrases and/or key words related to the selected traits. For instance, if a student is working on a paper discussing Iraq, the student may click the "economy" button when she needs information related to Iraqi economy. In response, the information retrieval system will add additional keywords, phrases or other entities that are related to the concept "economy," such as "growth rate," "recession," "currency," "exchange rate," "export," "import," "GDP," etc. to the search query constructed based on the student's active task. Furthermore, in response to the "economy" button being selected, the information sources 108 on which an information search will be conducted may include sources related to economy or financial services, such as databases of Wall Street Journal or Financial Times.

Information Source Customization

The information retrieval system 100 allows users to customize which information resources should be included in searches conducted by the information retrieval system 100. For example, users are able to create a wrapper that allows the information retrieval system 100 to search a specific Web site or database. This could easily be accomplished by automatically producing a wrapper that uses the site search functionality currently made available by Internet search engines to the public. Search engines typically support functionality that allows users to restrict their search to a given Internet Web site. Private Web sites, e.g., sites hosted behind a corporate firewall must be searched via a different mechanism supported by an indexing server. The information retrieval system 100 may be configured to couple to index servers to access private Web sites in addition to those currently indexed by public services. Furthermore, the information sources 108 may include local storage devices residing in the data processing system on which the user is working, or data storage devices coupling to the data processing system on which the user is working via a local data transmission network like intranet or LAN.

Furthermore, the information retrieval system 100 may select information sources 108 based on attributes related to the user, such as the user's occupation, position in a company, major in school, etc., as well as properties of the active task, application software, etc. As discussed earlier, the information processing component 152 may access a user profile to retrieve information related to the user. If the user is a biology teacher, the information retrieval system 100 may restrict or extend the search to information sources that relate to biology, education, etc.

The information retrieval system 100 also recognizes opportunities to provide assistance to the user by completing queries to special-purpose information repositories. The information processing component 152 has a facility for detecting standard textual entities (such as addresses or company names) and providing the user with an interface to useful special-purpose information resulting from a query to specific kinds of online information sources. In order to detect conceptual units for special purpose search, the information processing component 152 runs an array of simple detectors in parallel. Each detector is a finite state automaton accepting a sequence of tokens representing a conceptual unit. When a conceptual unit is detected, the information processing component 152 may present the user with a common action for the item, for example, in the form of a button they can press. For example, when the information processing component 152 detects an address, it presents a button which, when pressed, will display a web page with a map for that address using an automated map generation service. Such information may also be provided automatically. The information processing component 152 also detects opportunities for retrieving special-purpose, structured information in the context of document composition. For example, when a user inserts a caption with no image to fill it in their Microsoft Word® document, the information processing component 152 uses the words in the caption to form a query to an image search engine. Users can then drag and drop the images presented directly into their document. This analysis of actions is also performed using an array of simple application-specific detectors running in each application adapter.

Result Clustering

After the information processing component 152 generates a query, the query is sent to information sources 108 to retrieve information based on the query. The information sources 108 will then return results related to the query. However, the results returned from the information sources 108 often contain copies of the same page or similar pages from the same server or set of mirrored servers, the information processing component 152 may filter the results to eliminate redundant information. In one embodiment, the information processing component 152 collects search results and clusters similar pages. Only a single representative from each cluster is displayed to the user. In general, the system may further process and organize the results of searches in order to optimize their presentation to the user.

In one embodiment, the information processing component 152 clusters redundant results based on the document's title, and its URL. the information processing component 152 employs the following heuristic similarity metrics for each of these pieces of information:

Heuristic 1: Title similarity. Two titles are similar if they overlap significantly (e.g., they share common sub-strings). The certainty of similarity increases as a function of the square of the length of the title in words. Heuristic 2: URL similarity. Two URLs are similar if they have the same internal directory structure. The certainty of similarity increases proportionally as a function of the square of the length of the URL in directory units. More specifically, suppose two documents have titles $T_1[1 \ldots n]$ and $T_2[1 \ldots m]$, where each array element is a character. Let $maxSubStr(T_1, T_2)$ be the maximum subsequence of $T_1$ that occurs in $T_2$. Then the similarity of $T_1$ and $T_2$ is defined as $length(maxSubStr(T_1, T_2))/max\{length(T_1), length(T_2)\}$. If documents have URLs $U_1[1 \ldots n']$ and $U_2[1 \ldots m']$, where each array element is a URL directory unit, the same similarity metric can be applied. When a new response arrives from the network, it is immediately processed, and the resulting list of suggestions is updated and presented.

After the clustering process, the information processing component 152 may make the search result visible to the user, such as listing a list of search result in a window next to the one that the user is working on.

The disclosure has been described with reference to specific embodiments thereof. It will, however, be evident that various modifications and changes may be made thereto without departing from the broader spirit and scope of the disclosure. The concepts described in the disclosure can apply to various operations of the networked presentation system The invention is claimed as follows:

1. A method for formulating a context representation, the method comprising:
   selecting at least one keyword from a plurality of text items;
   determining a task associated with the plurality of text items;
   selecting at least one query transformation rule from a plurality of different query transformation rules based on the plurality of text items and the task;
   generating the context representation by applying the at least one query transformation rule to the at least one keyword, the query transformation rule causing the at least one keyword to be replaced by another keyword;
   generating a search query based on the context representation; and
   storing search results associated with the search query in a memory.

2. The method of claim 1, wherein determining the task associated with the plurality of text items is based on an access location of the plurality of text items.

3. The method of claim 1, wherein determining the task associated with the plurality of text items is based on a computer application associated with the task.

4. The method of claim 3, wherein the computer application includes an e-mail application.

5. The method of claim 4, wherein the at least one query transformation rule includes eliminating text included in a signature section of the e-mail application.

6. The method of claim 3, wherein the computer application includes a web browser, and a type of content associated with the web browser is electronic mail.

7. The method of claim 3, wherein the task is a multi-step task and the computer application includes an identifier of a particular step in the multi-step task.

8. The method of claim 1, wherein the task is shopping.

9. The method of claim 8, wherein the context representation includes a product name.

10. The method of claim 9 further comprising retrieving and displaying a coupon related to the product name.

11. The method of claim 10 further comprising retrieving and displaying a dealer related to the product name.

12. The method of claim 1, wherein determining the task associated with the plurality of text items is based on the plurality of text items.

13. The method of claim 1, wherein determining the task associated with the plurality of text items is based on a user profile.

14. The method of claim 1, wherein determining the task associated with the plurality of text items is based on an indication provided by a user.

15. The method of claim 14, wherein the computer application is associated with content, and the user indicates a subject matter associated with the content by selecting a button included in a graphical user interface.

16. The method of claim 1 further comprising transforming the context representation based on a user input related to a trait of search.

17. The method of claim 1 further comprising determining an information source on which an information search should be conducted based on the task.

18. The method of claim 17 further comprising determining a property associated with the information source, wherein retrieving the at least one query transformation rule is based on the property.

19. The method of claim 1, further comprising submitting a database query based on the context representation.

20. The method of claim 1, wherein selecting the at least one query transformation rule is based on a user profile.

21. The method of claim 1, wherein selecting the at least one query transformation rule is based on a computer application associated with the task.

22. A data processing system for formulating a context representation, the system comprising:
    a data processor for processing data;
    a data storage device for storing instructions;
    and a data transmission path coupled to the data processor and the data storage device, wherein the instructions, when executed by the data processor, controls the data processing system to perform the machine-implemented steps of:
    selecting at least one keyword from a plurality of text items;
    determining a task associated with the plurality of text items;
    selecting at least one query transformation rule from a plurality of different query transformation rules based on the plurality of text items and the task;
    generating the context representation by applying the at least one query transformation rule to the at least one keyword, the query transformation rule causing the at least one keyword to be replaced by another keyword;
    generating a search query based on the context representation; and
    storing search results associated with the search query in a memory.

23. The system of claim 22, wherein determining the task associated with the plurality of text items is based on an access location of the plurality of text items.

24. The system of claim 22, wherein determining the task associated with the plurality of text items is based on a computer application associated with the task.

25. The system of claim 24, wherein the computer application includes an e-mail application.

26. The system of claim 25, wherein the at least one query transformation rule includes eliminating text included in a signature section of the e-mail application.

27. The system of claim 24, wherein the computer application includes a web browser, and a type of content associated with the web browser is electronic mail.

28. The system of claim 24, wherein the task is a multi-step task and the computer application includes an identifier of a particular step in the multi-step task.

29. The system of claim 22, wherein the task is shopping.

30. The system of claim 29, wherein the context representation includes a product name.

31. The system of claim 30, wherein the instructions, when executed by the data processor, controls the data processing system to retrieve and display a coupon related to the product name.

32. The system of claim 31, wherein the instructions, when executed by the data processor, controls the data processing system to retrieve and display a dealer related to the product name.

33. The system of claim 22, wherein determining the task associated with the plurality of text items is based on a user profile.

34. The system of claim 22 wherein determining the task associated with the plurality of text items is based on an indication provided by a user.

35. The system of claim 34, wherein the computer application is associated with content, and the user indicates a subject matter associated with the content by selecting a button included in a graphical user interface.

36. The system of claim 22, wherein the instructions, when executed by the data processor, controls the data processing system to transform the context representation based on a user input related to a trait of search.

37. The system of claim 22, wherein the instructions, when executed by the data processor, controls the data processing system to determine an information source on which an information search should be conducted based on the task.

38. The system of claim 22, wherein the instructions, when executed by the data processor, controls the data processing system to determine a property associated with the information source, wherein retrieving the at least one query transformation rule is based on the property.

39. The system of claim 22, wherein the instructions, when executed by the data processor, controls the data processing system to submit a database query based on the context representation.

40. The system of claim 22, wherein selecting the at least one query transformation rule is based on a user profile.

41. The system of claim 22, wherein selecting the at least one query n is based on a computer application associated with the task.

* * * * *